(12) United States Patent
Bobko

(10) Patent No.: US 11,365,896 B2
(45) Date of Patent: Jun. 21, 2022

(54) NEGATIVE PRESSURE WALL BOX

(71) Applicant: Kenneth Edwin Bobko, Tacoma, WA (US)

(72) Inventor: Kenneth Edwin Bobko, Tacoma, WA (US)

( * ) Notice: Subject to any disclaimer, the term of this patent is extended or adjusted under 35 U.S.C. 154(b) by 369 days.

(21) Appl. No.: 16/675,014

(22) Filed: Nov. 5, 2019

(65) Prior Publication Data
US 2021/0131682 A1 May 6, 2021

(51) Int. Cl.
*B01D 46/00* (2022.01)
*B08B 15/02* (2006.01)
*F24F 8/10* (2021.01)
*F24F 3/167* (2021.01)

(52) U.S. Cl.
CPC ............ *F24F 8/10* (2021.01); *B01D 46/0041* (2013.01); *B08B 15/02* (2013.01); *F24F 3/167* (2021.01); *B01D 2279/51* (2013.01)

(58) Field of Classification Search
CPC .......... B01D 46/0041; B01D 2279/51; B08B 15/02; F24F 8/10; F24F 3/167
USPC ......... 55/385.2, 356; 454/187, 195, 66, 189; 135/131, 139, 145, 156, 157, 900
See application file for complete search history.

(56) References Cited

U.S. PATENT DOCUMENTS

| | | | | |
|---|---|---|---|---|
| 7,134,444 B2* | 11/2006 | Mintie | .................... | E04H 15/50 135/900 |
| 7,393,373 B1* | 7/2008 | Krippner | ............. | B29C 45/1701 128/205.26 |
| 2002/0071751 A1* | 6/2002 | Brice | .................... | B62B 5/0083 414/458 |
| 2003/0070404 A1* | 4/2003 | Calabrese | ................ | B25J 21/02 55/385.2 |
| 2004/0074212 A1* | 4/2004 | Yachi | ........................ | B01L 1/04 55/385.2 |
| 2008/0282652 A1* | 11/2008 | Wardlaw | ................... | F16P 1/06 55/385.2 |
| 2012/0315837 A1* | 12/2012 | Dander | .................. | B01D 53/04 454/239 |
| 2013/0097802 A1* | 4/2013 | Rioufrays | ......... | H01L 21/67389 15/304 |
| 2015/0258233 A1* | 9/2015 | Brown | .................... | A61L 2/208 422/114 |
| 2015/0284018 A1* | 10/2015 | Krosney | ................. | B62B 3/005 422/292 |
| 2018/0040493 A1* | 2/2018 | Kawai | ....................... | F24F 6/00 |

* cited by examiner

*Primary Examiner* — Minh Chau T Pham
(74) *Attorney, Agent, or Firm* — Arjomand Law Group, PLLC

(57) ABSTRACT

The disclosed apparatus make possible the maintenance, repair, alteration, and upgrade of walls and wall mounted facilitates within hospitals and cleanrooms while occupying a minimum area. In one embodiment the apparatus is a six-sided box with an open side, a transparent side, and a side with two hand ports. To operate, the apparatus is placed, from the open side, against the wall or the wall facility that needs repair or upgrade. Afterwards the air inside the apparatus is vacuumed to lower the air pressure with respect to the surrounding pressure before the hands of a repairman enters the apparatus through the two hand ports. Repair can start at this time while the apparatus maintains a negative inside air pressure and while no particles of contaminants can escape the apparatus. The vacuumed air may be released back into the room or hallway after it is filtered.

20 Claims, 2 Drawing Sheets

NEGATIVE PRESSURE WALL BOX

CROSS-REFERENCE(S) TO RELATED APPLICATION(S)

None

TECHNICAL FIELD

This application relates generally to negative air pressure hospital environment. More specifically, this application relates to a simple portable box with negative air pressure to be used in hospital environment for small repairs, upgrades, additions and alterations of the walls.

BRIEF DESCRIPTION OF THE DRAWINGS

The drawings, when considered in connection with the following description, are presented for the purpose of facilitating an understanding of the subject matter sought to be protected.

DETAILED DESCRIPTION

While the present disclosure is explained with reference to several illustrative embodiments described herein, it should be clear that the present disclosure should not be limited to such embodiments. Therefore, the description of the embodiments provided herein is illustrative of the present disclosure and should not limit the scope of the disclosure as claimed. In addition, while the following description references using a box with lower internal air pressure than its surrounding that can be placed against a wall to repair anything over the wall, it will be appreciated that the disclosure may include other forms of boxes and box arrangements to which the disclosed apparatus also apply. Furthermore, these apparatus may be utilized for repairs within hospitals and hospital rooms or in general within cleanrooms and the like.

In a hospital setting, certain populations are more vulnerable to airborne infections including immune-compromised patients, newborns and elderly people. Of course, hospital personnel and visitors can also be exposed to airborne infections as well. This is why it is important that certain rooms in a hospital have negative pressure. A negative pressure room in a hospital is used to contain airborne contaminants within the room. Harmful airborne pathogens include bacteria, viruses, fungi, yeasts, molds, pollens, gases, VOC's (volatile organic compounds), small particles and chemicals are part of larger list of airborne pathogens you can find in a hospital. Isolation rooms are negatively pressurized with respect to adjacent areas to prevent airborne contaminants from drifting to other areas and contaminating patients, staff and sterile equipment. A negative pressure isolation room is commonly used for patients with airborne infections. When rooms are not properly pressurized (positive or negative), airborne contaminants can escape putting the health of patients and staff at risk. No matter what system is used, the need for negatively and positively pressured rooms in the hospital is well documented.

Figure 1:
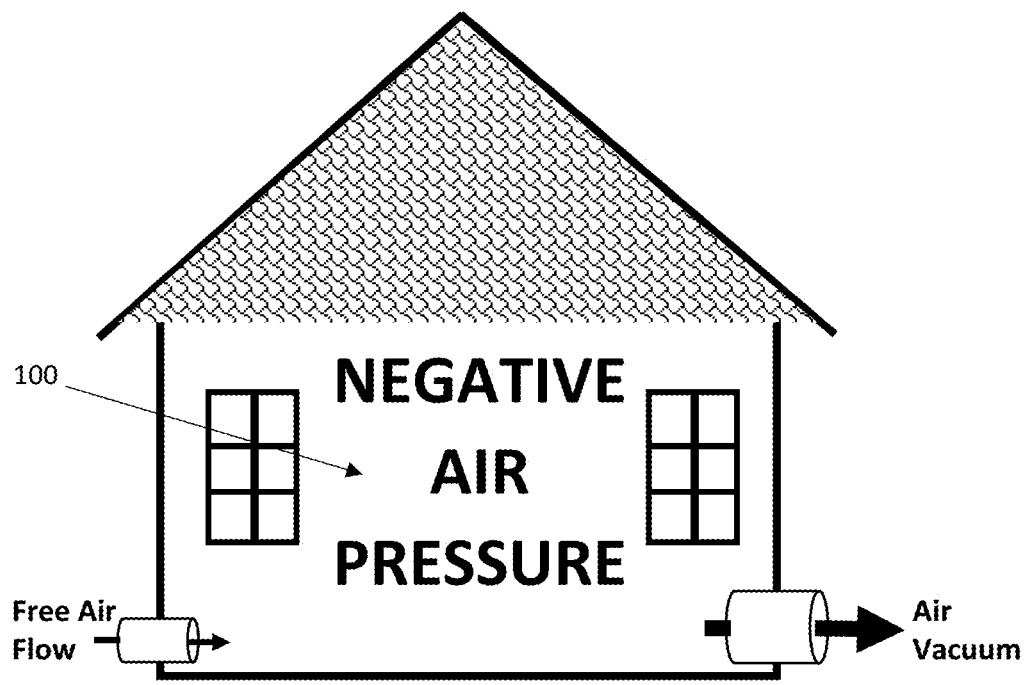
FIG. 1 illustrates the concept of negative pressure.

FIG. 1 illustrates the concept of negative pressure. As illustrated in this figure, the air within the area 100 is being drained/vacuumed faster than the outside air is allowed to enter it. This creates an air pressure within the area 100 which is lower than the outside air pressure. Control of the vacuum rate will control the inside air pressure. The method of the air pressure control may be manual or automatic. If it is automatic, it may be on-off control or continuous control. One can use digital or continuous circuits or microprocessors or any other kinds of automatic control systems. By keeping the air pressure of the area 100 under the outside air pressure the particles floating in the air within the area 100 cannot escape the area 100 from any opening.

Same is true about work/repair areas within hospitals and cleanrooms. For example if a part of a hospital room is being repaired or upgraded, care must be taken to contain the airborne particles, such as paint, dust, metal particles, and the like, so that such particles do not travel to other rooms or to a patient in the same room. Traditionally, if there is no patient in the room, the air pressure of the entire room is kept lower than the air pressure of the outside. But if there is a patient in the room or the room is being constantly used, the immediate area around the repair site is encapsulated by nylon sheets or temporary walls and the air pressure of the encapsulated area is reduced relative to the air pressure of the room. For small repairs, such as the repair of an electrical outlet within a hospital room or within a cleanroom, the traditional methods are unnecessary—they render large spaces useless for days or weeks and their setup is relatively expensive. The present disclosure offers a method and an apparatus by which a minimum volume of the room is occupied while the room is occupied by a patient and/or while the room is being used uninterruptedly.

Figure 2:
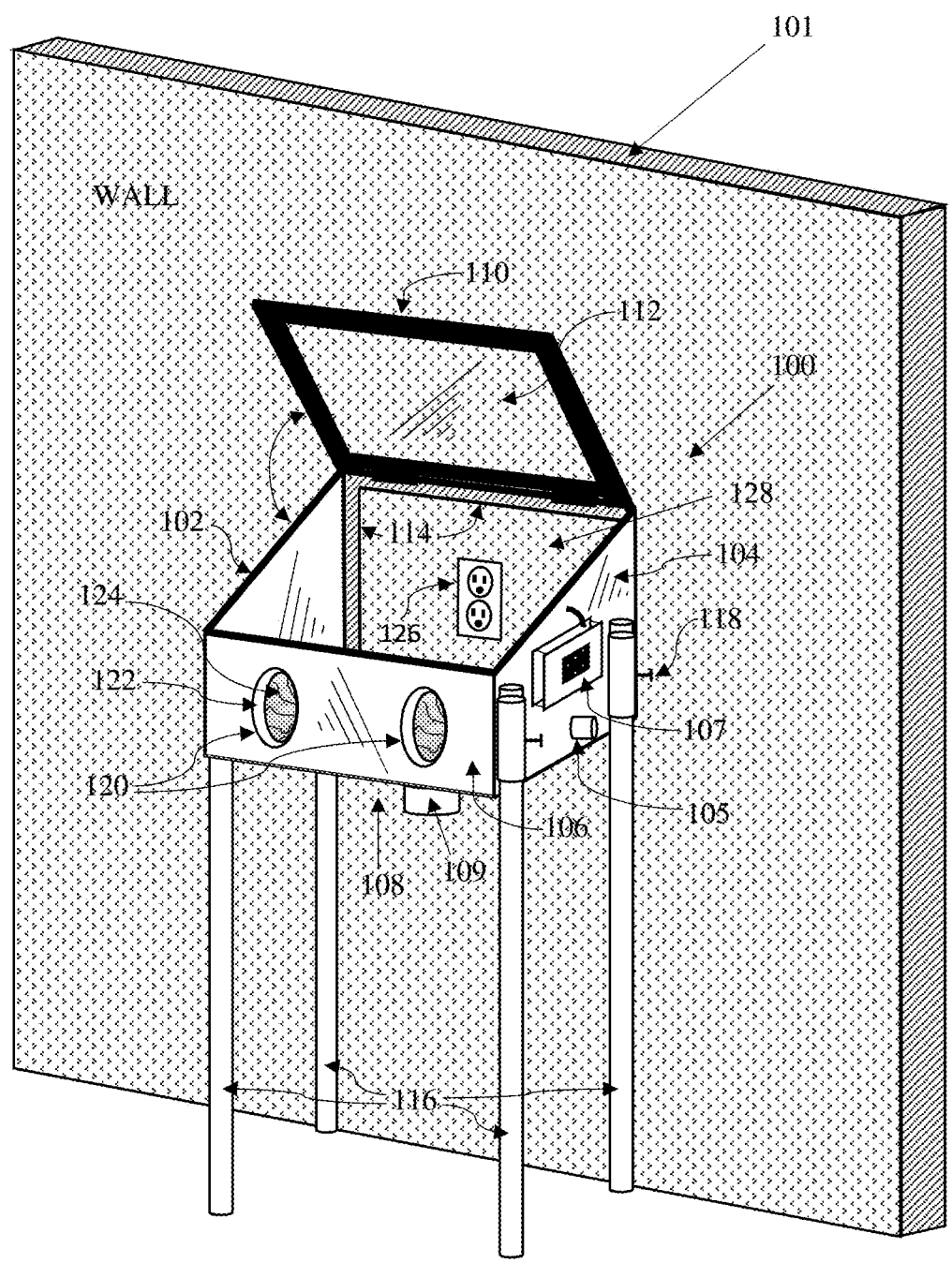
FIG. 2 a perspective illustration of an example negative pressure wall box.

FIG. 2 illustrates an example embodiment of the disclosed design. This apparatus is basically a box 100 with an openable side 110, an open side 128, one or two hand-entrance 120, and a vacuum-hole 109. Here, sides 102, 104, 106, and 108 are the four fixed sides of box 100. In this embodiment the vacuum-hole 109 is bored within side 108. Two flexible gloves 124 are permanently or detachably attached to the collars 122 of the hand-entrances 120, from within the box 100. An optional cleanup port 105 may be bored, for example, on side 104 and an optional pressure gauge 107 may be attached to side 104 and be in air communication with the inside of box 100. Additionally, optional adjustable-height and/or removable legs 116 hold box 100 at any desired height and can, for example, be adjusted by wing screws 118. In some embodiments the legs 116 may be telescopic or may be foldable. The open side 128, has optional gasket 114 around its edges to make it air-tight when the box 100 is placed against the wall 101. Lid or cover 110, which is partly made of a transparent sheet 112, such as glass or acrylic glass, can be opened and closed as shown in FIG. 2. In the closed position, the perimeter of lid 110, which is in contact with sides 102, 104 and 106, is airtight.

To repair, for example, the electrical outlet 126, which is on wall 101, the user adjusts the heights of legs 116, closes lid 110, and positions box 100 against wall 101 such that the outlet 126 is placed within the opening 128. Subsequently the user vacuums the air within box 100, from the vacuum hole 109, such that the pressure inside box 100 reaches a desired or a prescribed pressure that is lower than the surrounding air pressure. In different embodiments the air pressure inside the box 100 may be manually or automatically controlled. At this stage, no particle of dust or other contaminants can escape box 100. The user can then put his/her hands through hand-entrance 120 and into gloves 124 and repair outlet 126. At all times during the repair the user is able to watch the outlet 126 and his hands through the glass 112. If by any slight chance there exists any air communication between the inside and outside the box 100, the direction of the air flow will be from the outside to the inside of the box 100 and the contaminant particles cannot escape the box 100.

In some embodiments the air vacuumed from the box 100 is released back into the area surrounding the box 100 after it is filtered by special filters such as HEPA (High-efficiency particulate air) filters. HEPA, also known as high-efficiency particulate absorbing and high-efficiency particulate arrestance, is an efficiency standard of air filters. HEPA filters are used in applications that require contamination control, such as the manufacturing of disk drives, medical devices, semiconductors, nuclear, food and pharmaceutical products, as well as in hospitals. Filters meeting the HEPA standard must satisfy certain levels of efficiency. Common standards require that a HEPA air filter must remove—from the air that passes through—at least 99.95% (European Standard) or 99.97% (ASME and U.S. Department of Energy) of particles whose diameter is greater than or equal to 0.3 µm.

After completing the repair, the inside pressure of box 100 may be increased to reach the surrounding pressure and the box 100 may be detached from wall 101. An optional filter may also be placed within or over vacuum hole 109 to prevent ay particles to travel to the vacuum machine (not shown). While lid 110 is closed and box 100 is against the wall 101, the user can clean up the debris inside box 100 by vacuuming the debris through cleanup hole 105. However, the cleanup hole 105 will normally stay closed. For transporting the box 100, its legs 116 may be removed, retracted, folded, and the like.

Please note that box 100 may have any shapes such as a semi-sphere or have more than six sides or have no legs at all since it can stick to the wall while it has negative air pressure. In some embodiments more than one side of the box 100 may be made of transparent materials. In other embodiments the vacuum machine may be an integral part of the box 100. In yet other embodiments, instead of the gloves, each hand entrance may be covered by a punctured diaphragm through which a hand can enter such that the contact area between the forearm and the diaphragm is airtight. In various embodiments the vacuum switch may be a foot pedal or a hand switch inside the box 100, or both. In yet other embodiments there may be lights of different kinds within the box 100. In some embodiments the inside air pressure of the box 100 is some function of the outside air pressure. In another embodiment the hand entrances may simply be open holes (i.e. without gloves or diaphragms) and the constant vacuuming of the box keeps the inside air pressure of the box lower than the surrounding air pressure.

Changes can be made to the claimed invention in light of the above Detailed Description. While the above description details certain embodiments of the invention and describes the best mode contemplated, no matter how detailed the above appears in text, the claimed invention can be practiced in many ways. Details of the system may vary considerably in its implementation details, while still being encompassed by the claimed invention disclosed herein.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the claimed invention to the specific embodiments disclosed in the specification, unless the above Detailed Description section explicitly defines such terms. Accordingly, the actual scope of the claimed invention encompasses not only the disclosed embodiments, but also all equivalent ways of practicing or implementing the claimed invention.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B," and also the phrase "A and/or B" will be understood to include the possibilities of "A" or "B" or "A and B."

The above specification, examples, and data provide a complete description of the manufacture and use of the composition of the invention. Since many embodiments of the invention can be made without departing from the spirit and scope of the invention, the invention resides in the claims hereinafter appended. It is further understood that this disclosure is not limited to the disclosed embodiments, but is intended to cover various arrangements included within the spirit and scope of the broadest interpretation so as to encompass all such modifications and equivalent arrangements.

While the present disclosure has been described in connection with what is considered the most practical and preferred embodiment, it is understood that this disclosure is not limited to the disclosed embodiments, but is intended to cover various arrangements included within the spirit and scope of the broadest interpretation so as to encompass all such modifications and equivalent arrangements.

What is claimed is:

1. A maintenance box with any number of flat or curved sides and with negative inside air pressure, for small repairs or upgrades in hospitals and cleanrooms, the maintenance box comprising:
    at least one complete or partially transparent side that is configured to be opened and closed for gaining access to inside of the maintenance box, wherein there is no or minimum air communication between outside and inside of the maintenance box through circumference of the transparent side when the transparent side is closed;
    at least one open side, wherein the open side is placed against a wall or a surface where the repair or the upgrade is performed such that the perimeter of the open side encloses the repair or upgrade area and wherein no or minimum air communication is allowed between outside and inside of the maintenance box;
    at least one air vacuum port through which air within the maintenance box is vacuumed to reduce inside air-pressure of the maintenance box with respect to air pressure outside of the maintenance box; and
    at least one hand port to circumference of which a glove of any material is hermetically attached and through which hand port and which glove a hand may enter inside the maintenance box to reach the repair or the upgrade area, wherein there is no or minimum air communication between outside and inside of the maintenance box through the glove-covered hand port.

2. The maintenance box of claim 1, wherein the air vacuumed from the maintenance box is cleaned by at least one desired filter and is released back into surrounding area of the maintenance box.

3. The maintenance box of claim 1, further including one or more legs, wherein the legs are adjustable length, removable, retractable, telescopic, and/or foldable.

4. The maintenance box of claim 3, wherein the maintenance box has four legs.

5. The maintenance box of claim 1, wherein the maintenance box has two hand ports.

6. The maintenance box of claim 1, further comprising an air pressure gauge that indicates an air pressure of the inside of the maintenance box.

7. The maintenance box of claim 1, further comprising a cleanup port for cleaning the inside of the maintenance box when the maintenance box is against a wall and the complete or partially transparent side is closed.

8. The maintenance box of claim 1, further comprising a sealing gasket around periphery of the complete or partially transparent side.

9. The maintenance box of claim 1, further comprising a sealing gasket around periphery of the open side such that upon placing the open side against a wall, there is no or minimum air communication between outside and inside of the maintenance box through the periphery of the open side.

10. The maintenance box of claim 1, further comprising at least one filter inside or over the air vacuum port.

11. A repair box, with six flat sides, for small repairs and/or upgrades in hospitals and cleanrooms, the repair box comprising:
    at least one complete or partially transparent side that is configured to be opened and closed for gaining access to inside of the repair box, wherein there is no or minimum air communication between outside and inside of the repair box through circumference of the transparent side when the transparent side is closed;
    at least one flat open side, wherein the open side is placed against a wall or a surface where the repair or the upgrade is performed such that circumference of the open side encloses the repair or upgrade area and wherein no or minimum air communication is allowed between outside and inside of the maintenance box;
    at least one air vacuum port through which air inside the repair box is vacuumed out to reduce inside air-pressure of the maintenance box with respect to air pressure outside of the maintenance box; and
    two hand ports to each of which a glove is hermetically attached and through each of which and the attached glove a hand may enter inside the repair box to reach the repair or the upgrade area, wherein there is no or minimum air communication between outside and inside of the repair box through the glove-covered hand ports.

12. The repair box of claim 11, further comprising at least one leg wherein the leg is adjustable length, removable, retractable, telescopic, and/or foldable.

13. The repair box of claim 11, wherein the air vacuumed from the repair box is cleaned by a desired filter and is released back into surrounding area of the repair box.

14. The repair box of claim 13, wherein the desired filter is a HEPA (High-efficiency particulate air) filter.

15. The repair box of claim 11, wherein the repair box has two hand ports.

16. The repair box of claim 11, further comprising an air pressure gauge that indicates an air pressure of the inside of the repair box.

17. The repair box of claim 11, further comprising a cleanup port for cleaning the inside of the repair box when the repair box is against a wall and the complete or partially transparent side is closed.

18. The repair box of claim 11, further comprising a sealing gasket around periphery of the complete or partially transparent side.

19. The repair box of claim 11, further comprising a sealing gasket around periphery of the open side such that upon placing the open side against a wall, there is no or minimum air communication between outside and inside of the repair box through the periphery of the open side.

20. The repair box of claim 11, further comprising at least one filter inside or over the air vacuum port.

* * * * *